Patented Mar. 10, 1953

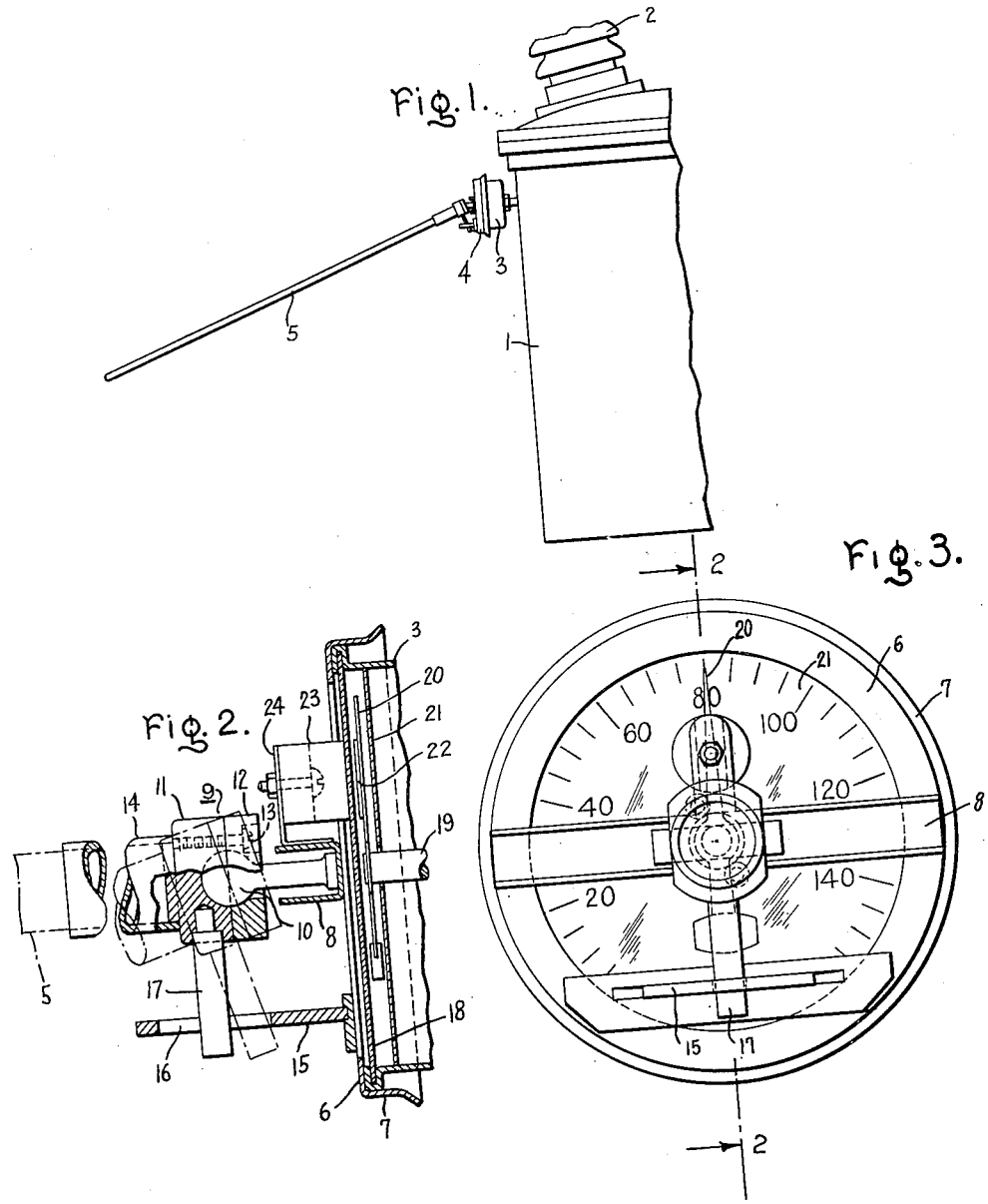

2,630,778

UNITED STATES PATENT OFFICE 2,630,778

MAGNETIC RESETTING TOOL FOR MAXIMUM INDICATORS

Philip J. Hatch, Pittsfield, Mass., assignor to General Electric Company, a corporation of New York Application February 2, 1952, Serial No. 269,650

2 Claims. (Cl. 116—129)

1

This invention relates to improvements in tools for magnetically resetting a maximum indicating pointer of a gauge or indicator and has for its principal object the provision of a novel and simple device of this kind which permits the resetting of inaccessibly located indicators with comparative safety to the operator.

In the accompanying drawing, Fig. 1 illustrates the resetting tool in connection with a temperature indicator mounted high above the ground on the side of a large high voltage power transformer, Fig. 2 is an enlarged cross-sectional view of the tool in the position shown in Fig. 1 and Fig. 3 is a rear view of the tool.

Referring now to the drawing and more particularly to Fig. 1, there is shown therein a large power transformer which is provided with a high voltage insulating bushing 2 and a maximum reading temperature indicator 3 mounted in the side wall of the transformer tank and sufficiently high above the ground so that it cannot readily be reached by an attendant standing on the ground near the base of the transformer. For resetting the maximum temperature indicating pointer of the device 3, there is provided a tool 4 provided with relatively long wooden or other electrically insulating operating rod 5, the free end of which may be grasped by an attendant or operator standing on the ground.

Fig. 2 shows the detailed construction of the tool whose principal part is a circular rim-like metal member 6 provided with an integral, forwardly projecting, outwardly flared flange 7. Extending diametrically across the back of the rim 6 is a rearwardly projecting channel bracket 8 which may be welded or brazed to the rim 6. Fixed to the center of the channel bracket 8 is a pedestal-mounted ball and socket connector 9 comprising a ball part 10 embraced by a two-part socket assembly, one part 11 of which comprises the main socket member and the other part 12 of which consists of a cap 12 which is fastened to the main part 11 by screws 13. Attached to the main socket member 11 is a tube member 14 for receiving an end of the insulating operating rod 5 shown in Fig. 1.

Also attached to the rear of the rim 6 near an edge thereof is another rearwardly extending bracket 15 having a rearwardly extending slot 16 for receiving a pin 17 which is fixed in the main socket member 11.

The flanged rim 6—7 is adapted to fit snugly over the edge of the face of a circular or dial-type indicator 3 having a transparent face 18 and an operating shaft 19 carrying a maximum indicating pointer 20 which cooperates with indicia on a suitable dial or scale 21. The pointer 20 is provided with an iron armature 22 for resetting purposes and this armature is mounted a predetermined distance off center from the shaft 19 which, of course, is pivotally mounted in line with the center of the transparent face 18. For cooperating with the magnetic armature 22 is a permanent magnet 23 attached by means of a suitable bracket 24 to the channel bracket 8 of the resetting tool. The magnet 23 is mounted as far off center by the bracket 24 as is the armature 22.

In the operation of the device, an attendant, by means of the long rod 5, places the rim 6 against the face of the instrument 3 with the flange 7 of the rim surrounding the edge of the instrument face. Then by rotating the operating rod 5 on its axis, the tool will be rotated a like amount so that the permanent magnet 23 will, due to its magnetic attraction for the armature 22, impart a corresponding rotary motion to the maximum pointer 20 when the magnet and armature are in close proximity.

The ball and socket connector in combination with the slot in bracket 15 and the pin 17 constitutes a universal joint so that the tool may be rotated with the shaft 5 at almost any angle to the face of the indicator.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. A magnetic tool for setting a magnetic maximum indicating pointer comprising, in combination, a circular rim having a forwardly extending flange for fitting over a circular face of a dial-type indicator, a bracket extending across the back of said rim along a diameter thereof, a socket member for receiving an end of an insulating operating rod, a universal joint connector between said socket member and the center of said bracket, a forwardly facing permanent magnet, and means for mounting said magnet substantially off center on said bracket substantially in the plane of said rim.

2. A resetting tool for a maximum temperature indicator which is normally mounted relatively inaccessibly on the side of high voltage electrical apparatus and which indicator has a circular transparent face covering a movable pointer pivotally mounted in line with the center of said face and which pointer carries an off-center iron armature comprising, in combination, a circular rim having a forwardly extending outwardly flared flange for fitting over the edge of said face, a diametrically extending bracket on the back of said rim, a socket member for receiving an end of an insulating operating rod, a ball and socket connector for attaching said socket member to the center of said bracket for universal angular motion with respect thereto, a second rearwardly extending bracket attached to said rim near an edge thereof, a rearwardly extending slot in said second bracket, a pin attached to said connector and extending into said slot, and a forwardly facing permanent magnet attached to said diametrically extending bracket off-center by a distance equal to the off-center distance of said armature.

PHILIP J. HATCH.

REFERENCES CITED

The following references are of record in the file of this patent:

UNITED STATES PATENTS

| Number | Name | Date |
|---|---|---|
| 2,072,233 | Wilson | Mar. 2, 1931 |
| 2,323,996 | Hubbard | July 13, 1943 |